(12) United States Patent
Ruprecht

(10) Patent No.: US 7,651,070 B2
(45) Date of Patent: Jan. 26, 2010

(54) CANTER ELEMENT CONTROLLED COMBINATION MANIFOLD, VALVE AND FILTER MODULE SYSTEM

(75) Inventor: John C. Ruprecht, North Oaks, MN (US)

(73) Assignee: Clean & Clear Corporation, White Bear Lake, MN (US)

( * ) Notice: Subject to any disclaimer, the term of this patent is extended or adjusted under 35 U.S.C. 154(b) by 519 days.

(21) Appl. No.: 11/334,787

(22) Filed: Jan. 19, 2006

(65) Prior Publication Data

US 2007/0221583 A1 Sep. 27, 2007

(51) Int. Cl.
*F16L 37/28* (2006.01)
*B01D 35/153* (2006.01)
(52) U.S. Cl. ............... 251/149.9; 210/234; 210/420
(58) Field of Classification Search ................. None
See application file for complete search history.

(56) References Cited

U.S. PATENT DOCUMENTS

| | | | | | |
|---|---|---|---|---|---|
| 48,273 | A | * | 6/1865 | Hallowell | 210/234 |
| 1,171,116 | A | * | 2/1916 | Haeseler | 137/550 |
| 1,403,056 | A | * | 1/1922 | Noble | 251/252 |
| 1,840,883 | A | * | 1/1932 | Brecher | 210/232 |
| 2,732,075 | A | * | 1/1956 | Bender | 210/443 |
| 3,283,354 | A | * | 11/1966 | Simmons | 15/104.062 |
| 3,399,776 | A | * | 9/1968 | Knuth | 210/234 |
| 3,485,371 | A | * | 12/1969 | Costantini | 210/135 |
| 3,528,554 | A | * | 9/1970 | Ogden et al. | 210/343 |
| 3,559,574 | A | * | 2/1971 | Gates | 101/366 |
| 3,684,100 | A | * | 8/1972 | Close | 210/444 |
| 3,746,171 | A | | 7/1973 | Thomsen | 210/234 |
| 3,756,275 | A | * | 9/1973 | Barrera | 137/590 |
| 3,907,688 | A | | 9/1975 | Close | 210/424 |
| 3,935,106 | A | * | 1/1976 | Lipner | 210/232 |
| 3,982,520 | A | * | 9/1976 | Wheeler | 123/196 A |
| 4,102,473 | A | * | 7/1978 | Draxler | 220/319 |
| 4,271,020 | A | * | 6/1981 | Van Meter | 210/133 |
| 4,371,439 | A | * | 2/1983 | Thornton | 210/232 |
| 4,379,053 | A | * | 4/1983 | Brane | 210/234 |
| 4,529,515 | A | * | 7/1985 | Selz | 210/234 |
| 4,615,812 | A | * | 10/1986 | Darling | 210/805 |
| 4,735,716 | A | * | 4/1988 | Petrucci et al. | 210/232 |
| 4,832,077 | A | * | 5/1989 | Pilolla | 137/549 |
| 4,857,189 | A | * | 8/1989 | Thomsen et al. | 210/232 |
| 4,877,521 | A | | 10/1989 | Petrucci et al. | 210/171 |
| 4,904,382 | A | * | 2/1990 | Thomsen | 210/236 |
| 4,915,831 | A | * | 4/1990 | Taylor | 210/232 |
| 4,956,086 | A | * | 9/1990 | Thomsen et al. | 210/232 |
| 5,060,982 | A | * | 10/1991 | Matsushita | 285/190 |
| 5,101,850 | A | * | 4/1992 | Todd | 137/15.17 |
| 5,107,896 | A | | 4/1992 | Otto | 137/625.29 |
| 5,254,242 | A | * | 10/1993 | van der Meer et al. | 210/91 |
| 5,298,088 | A | * | 3/1994 | Gray, Jr. | 137/75 |
| 5,316,347 | A | * | 5/1994 | Arosio | 285/26 |

(Continued)

FOREIGN PATENT DOCUMENTS

WO   WO 2007145944 A1 * 12/2007

*Primary Examiner*—Robert James Popovics
(74) *Attorney, Agent, or Firm*—Fredrikson & Byron, P.A.

(57) ABSTRACT

A combination manifold and single lever cantered element system to which a filter module removably attaches. A ¼ rotation of the single lever mediates simultaneous operation of both valving and filter module release, and facilitates changing removably attachable filter modules without the need for tools.

4 Claims, 17 Drawing Sheets

U.S. PATENT DOCUMENTS

| | | | |
|---|---|---|---|
| 5,334,309 A * | 8/1994 | Huggett et al. | 210/133 |
| 5,336,406 A * | 8/1994 | Stanford et al. | 210/235 |
| 5,456,830 A * | 10/1995 | Stanford et al. | 210/235 |
| 5,486,288 A | 1/1996 | Stanford et al. | 210/235 |
| 5,507,530 A * | 4/1996 | Mahaney | 285/26 |
| 5,591,332 A * | 1/1997 | Reid et al. | 210/235 |
| 5,744,030 A * | 4/1998 | Reid et al. | 210/235 |
| 5,753,107 A * | 5/1998 | Magnusson et al. | 210/109 |
| 5,826,854 A * | 10/1998 | Janvrin et al. | 251/149.9 |
| 6,027,644 A * | 2/2000 | Magnusson et al. | 210/235 |
| 6,068,770 A * | 5/2000 | Niermeyer et al. | 210/321.6 |
| 6,120,685 A * | 9/2000 | Carlson et al. | 210/232 |
| D433,094 S * | 10/2000 | Magnusson et al. | D23/209 |
| 6,360,764 B1 * | 3/2002 | Fritze | 137/15.01 |
| 6,378,907 B1 * | 4/2002 | Campbell et al. | 285/26 |
| 6,426,001 B1 * | 7/2002 | Fritze | 210/239 |
| 6,457,322 B1 * | 10/2002 | Kim et al. | 62/318 |
| 6,458,269 B1 * | 10/2002 | Bassett et al. | 210/119 |
| D472,299 S * | 3/2003 | Fritze | D23/209 |
| D472,604 S * | 4/2003 | Fritze | D23/209 |
| 6,595,240 B2 * | 7/2003 | Leys et al. | 137/625.5 |
| 6,632,355 B2 * | 10/2003 | Fritze | 210/232 |
| 6,645,376 B2 | 11/2003 | Marioni | 210/169 |
| 6,739,578 B2 * | 5/2004 | Barton et al. | 251/149.9 |
| 6,977,006 B2 * | 12/2005 | Reid | 55/495 |
| 7,021,667 B2 * | 4/2006 | Campbell et al. | 285/26 |
| 7,037,424 B2 * | 5/2006 | Niermeyer et al. | 210/321.6 |
| 7,101,479 B2 * | 9/2006 | Stockbower | 210/232 |
| 7,135,113 B2 * | 11/2006 | Bassett et al. | 210/232 |
| 7,138,052 B2 * | 11/2006 | Reid | 210/232 |
| 7,147,772 B2 * | 12/2006 | Fritze | 210/232 |
| 7,186,338 B2 * | 3/2007 | Boisvert | 210/232 |
| 7,261,117 B2 * | 8/2007 | Mork et al. | 137/1 |
| 7,264,718 B2 * | 9/2007 | Knoll et al. | 210/232 |
| 7,338,599 B2 * | 3/2008 | Hiranga et al. | 210/232 |
| 7,387,210 B2 * | 6/2008 | Burrows et al. | 210/443 |
| 7,407,148 B2 * | 8/2008 | Bassett et al. | 251/149.9 |
| 7,476,314 B2 * | 1/2009 | Reid | 210/232 |
| 7,481,928 B2 * | 1/2009 | Fritze | 210/234 |
| 7,540,956 B1 * | 6/2009 | Kurth et al. | 210/232 |
| 2002/0066488 A1 * | 6/2002 | Leys et al. | 137/625.5 |
| 2002/0125183 A1 * | 9/2002 | Chaney et al. | 210/234 |
| 2003/0213736 A1 * | 11/2003 | Hiranga et al. | 210/232 |
| 2003/0213738 A1 * | 11/2003 | Hiranga et al. | 210/236 |
| 2006/0197050 A1 * | 9/2006 | Schlude | 251/331 |
| 2006/0254971 A1 * | 11/2006 | Tubby et al. | 210/235 |
| 2007/0199876 A1 * | 8/2007 | Tubby et al. | 210/232 |
| 2007/0221583 A1 * | 9/2007 | Ruprecht | 210/767 |
| 2007/0221584 A1 * | 9/2007 | Ruprecht | 210/767 |
| 2007/0221586 A1 * | 9/2007 | Ruprecht | 210/799 |
| 2007/0267590 A1 * | 11/2007 | Schlude | 251/251 |
| 2007/0295667 A1 * | 12/2007 | Ruprecht | 210/693 |
| 2008/0041796 A1 * | 2/2008 | Ruprecht | 210/799 |
| 2008/0142426 A1 * | 6/2008 | Greco et al. | 210/234 |
| 2008/0156711 A1 * | 7/2008 | Vitan et al. | 210/133 |

* cited by examiner

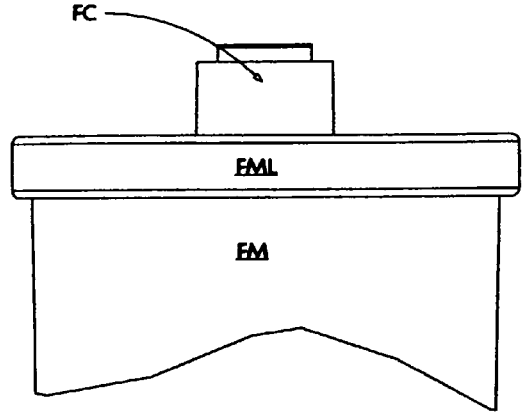
FIG. 9a
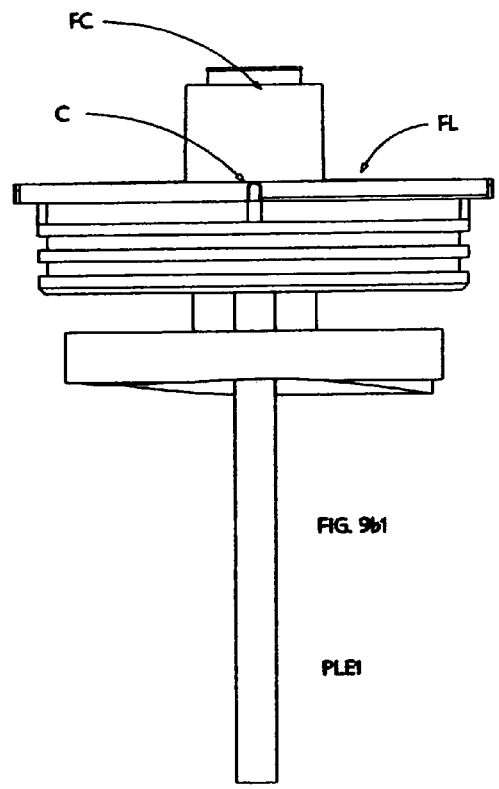
FIG. 9b1
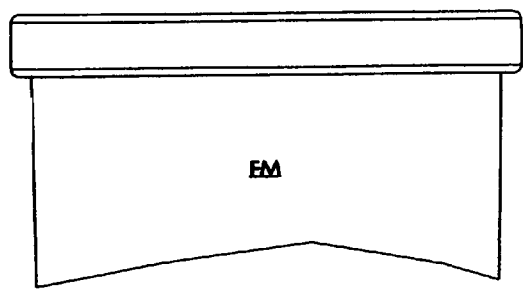
FIG. 9b2

CANTER ELEMENT CONTROLLED COMBINATION MANIFOLD, VALVE AND FILTER MODULE SYSTEM

TECHNICAL FILED

The present invention relates to filter systems, and more particularly to combination manifold and single lever quarter-turn system to which a filter module removably attaches, thereby facilitating changing said removably attachable filter modules.

BACKGROUND

It is common practice when Installing a manifold to which a replaceable fluid filter module attaches, to also install separate valves ahead of, and usually after, said manifold. This is to enable changing the filter module without disrupting fluid to other locations in a service system. In use, when it is necessary to change a filter module which is secured to the manifold, the separate valves are first shut off, and then the manifold is operated to release the filter module. A new filter module is then put into place and the manifold operated to secure it, followed by reopening the separate valves ahead of and after said manifold. This is tedious.

A Search of Patents provided a number of Patents, of which the most relevant is believed to be U.S. Pat. No. 6,645,376 to Marioni. The system of the 376 Patent provides a lever (33) which provides fluid flow control, however, filter removal and installation requires separate action. A Patent to Knuth, U.S. Pat. No. 3,399,776 describes a detachable filter system which allows for removal of a filter without interruption of fluid flow, which is directed through a bypass. U.S. Pat. No. 5,486,288 provides a system for allowing removal and replacement of a filter cartridge by a rotation motion thereof. Said system does not comprise a lever control however. U.S. Pat. No. 5,107,896 to Otto has a lever, but it only operates the inlet side to effect bypass, shut-off and in-service capability. U.S. Pat. No. 4,877,521 to Petrucci et al. provides a system that allows a canister to be rotated into place in a head by a ¼ turn, but does not involve lever control. U.S. Pat. No. 3,746,171 describes a filter assembly with a lever that rotates vertically about a horizontally oriented axis, rather than in a horizontally oriented direction about a vertically oriented axis. U.S. Pat. No. 3,907,688 to Close describes a valve for a filter involving a lever which controls fluid directing, however, operation of the lever does not simultaneously control the attachment or release of a filter cartridge, which is attached by a hinged band. U.S. Pat. No. 4,857,189 to Thomsen et al. was also identified, but is not believed to be particularly relevant.

A need remains for a system comprising a manifold and a single lever, rotation of which by ¼ of a turn about a vertically oriented axis controls both fluid flow and filter cartridge securing.

DISCLOSURE OF THE INVENTION

The present invention is a system comprising a manifold and cantered element which comprises a single lever that is required to rotate only ¼ of a turn to, substantially simultaneously, shut-off inlet and outlet fluid supplies, and allow dropping a filter module, which filter module presents with dynamic fluid pressure, therefrom. Likewise, when the single lever is rotated ¼ of a turn in an opposite direction, a new filter can be drawn into an operational position and, substantially simultaneously, the inlet and outlet fluid supplies are re-opened. No tools are required, and the system design and simple operation thereof makes mis-installation of a filter module essentially impossible. The multi-tasking manifold/single lever combination then performs in a single operation what other known systems require two actions to accomplish. The filter module is designed so that the inlet and outlets thereof can only match to the inlet and outlets of the manifold, thereby preventing backward installation.

The present invention then comprises a combination manifold and valve system to which a filter module removably attaches. Said combination manifold and valve system is constructed such that when the manifold is operated to allow affixing a filter module the valve(s) in the manifold are caused to be closed, and when the manifold is operated to securely affix a filter module thereto, the valve(s) in the manifold are caused to be open. The system is characterized in that a single lever which rotates no more than ¼ turn, completely and substantially simultaneously controls both the valves and filter module mounting.

The filter module removably attaches and is held in place by means for securing said filter module and said combination manifold and valve system comprises a manifold central structural element with two ports to which fluid carrying pipes affix, each of said ports having fluid carrying piping projecting therefrom into a filter module which is secured in place on said manifold, by said means for securing said filter module. Said combination manifold and valve system has affixed thereto means simultaneously operating said valves and means for securing said filter module to said manifold, such that when a filter module is secured in place on said manifold by said means for securing said filter module, said valves are open, and when said filter module is not secured in place on said manifold, said valves are closed.

A mechanism for controlling the securing of said filter module to said manifold comprises a single lever of a cantered element which is rotatable affixed to the top of said manifold central structural element, as it is viewed in side elevation, such that when said lever of said cantered element is rotated in one direction the means for securing said filter module are caused to rise, and when said single lever of said cantered element is rotated in the opposite direction said means for securing said filter module are caused to lower.

The preferred filter module has a lip at an upper aspect thereof, and said means for securing said filter module has hook-like structures which can catch said lip. Said means for securing said filter module additionally has an elongated slit therein into which projects a rod which is secured stationary with respect to said manifold central structural element.

An alternative recitation of the present invention combination manifold and valve system provides that it comprises:

a central structural element which has a substantially closed top and sides, said sides having first and second openings therein, each of which is suitable for attaching thereto a fluid carrying pipe, said central structural element having therewithin a substantially circular inner cavity;

there being, during use, a filter module comprising filter media therewithin, secured to the lower extent of said central structural element as viewed in side elevation;

present in said substantially circular inner cavity there being snuggly present a rotatable structural element having a top and a side wall, said rotatable structural element having first and second openings in said wall, which openings are functionally projected inwardly and then downward in the form of unequal lengths of pipe-like elements such that fluid entered into one thereof passes through said filter module which is affixed to the lower aspect of said combination manifold and valve system and out of the other thereof;

said first and second openings in said central structural element and said first and second openings in said rotatable structural element wall being arranged with respect to one another such that when the first of the openings in said central structural element and the first of said openings in said rotatable structural element wall are aligned by relative rotation therebetween, then simultaneously so are the second openings in the central structural element and said second opening is said rotatable structural element wall;

there being a rotatably mounted single lever of said cantered element at the top of said central structural element, and there being means for securing said filter module slidably affixed to the sides of said central structural element, said cantered element and means for securing said filter module being functionally interrelated such that causing said single lever of said cantered element to rotate about a substantially vertically oriented axis causes said means for securing said filter module to slide with respect to said central structural element;

said means for securing said filter module having hook-like structures at lower aspects thereof and a slit shaped opening thereabove, into which slit shaped opening projects a rod which is secured stationary with respect to said central structural element;

said combination manifold and valve system filter module further comprising a lip at an upper extent thereof, which hook-like structures are of a shape to catch.

The slit shaped openings in the means for securing said filter module having hook-like structures at lower aspects thereof is elongated and can be oriented such that its elongated dimension projects substantially vertically, as viewed in side elevation, or said slit shaped opening can be oriented such that its elongated dimension projects at an angle between vertical and horizontal, again as viewed in side elevation. The later configuration is preferred.

The filter module preferably comprises, as viewed in side elevation, receptors in an outer covering thereof which have a vertical and a horizontal section such that each forms an "L" shape. Said filter module then further comprises a filter lid which attaches to said filter module outer covering by way of sliding nibs on said filter lid into the vertical portions of said receptors on said filter module outer covering, and then causing a slight rotation motion of filter lid so that nibs are positioned in the horizontal portions of said receptor portions. In use rotating said filter lid so that said nibs thereon are in the vertical sections of the receptors in the filter module outer covering allows entering and removing the filter lid, and rotating said filter lid so that the nibs are in the horizontal portions of the "L" shaped receptors secures said lid in place in the filter module.

A method of filtering fluid comprising the steps of:
a) providing a combination manifold and valve system comprising:
   a central structural element which has substantially closed top and sides, said sides having first and second openings therein, each of which is suitable for attaching thereto a fluid carrying pipe, said central structural element having therewithin a substantially circular inner cavity;
   there being, during use, a filter module comprising filter media therewithin, secured to the lower extent of said outer cover;
   present in said substantially circular inner cavity there being snuggly present a rotatable structural element having a top and wall, said rotatable structural element having first and second openings in said wall, which openings are functionally projected inwardly and then downward in the form of unequal lengths of pipe-like elements such that fluid entered into one thereof passes through said filter module which is affixed to the lower aspect of said combination manifold and valve system and out of the other thereof;
   said first and second openings in said central structural element and said first and second openings in said rotatable structural element wall being arranged with respect to one another such that when the first of the openings in said central structural element and the first of said openings in said rotatable structural element wall are aligned by relative rotation therebetween, then simultaneously so are the second openings in the central structural element and said second opening is said rotatable structural element wall;
   there being a rotatably mounted single lever of a cantered element at the top of said central structural element, and there being means for securing said filter module slidably affixed to the sides of said central structural element, said means for securing said filter module and said central structural element being functionally interrelated such that causing said single lever of said cantered element to rotate about a substantially vertical axis, causes said means for securing said filter module to slide with respect to said central structural element;
   said means for securing said filter module having hook-like structures at lower aspects thereof and said filter module further comprising a lip at an upper extent thereof, which hook-like structures are of a shape to catch said lip;
b) with fluid pressure absent affixing fluid carrying pipes to said first and second openings of said outer cover,
   rotating said rotatably mounted single lever of said cantered element at the top of said central structural element so that the first and second holes in said central structural element and said first and second holes in said rotatable structural element wall are not aligned and so said means for securing said filter module having hook-like structures at lower aspects thereof are lowered;
c) entering a filter module such that the lip at said upper extent thereof is grasped by said hook-like structures of said means for securing said filter module;
d) rotating said rotatably mounted single lever of said cantered element at the top of said outer cover so that the first and second holes in said central structural element and said first and second holes in said rotatable structural element wall are aligned and so said means for securing said filter module having hook-like structures at lower aspects thereof are raised to secure said filter module to said combination manifold and valve system; and
e) pressurizing said fluid in said fluid carrying pipes which are affixed to said first and second openings of said central structural element.

Said method can further comprise the steps of:
f) rotating said rotatably mounted single lever of said cantered element at the top of said central structural element so that the first and second holes in said central structural element and said first and second holes in said rotatable structural element wall are not aligned and so said means for securing said filter module having hook-like structures at lower aspects thereof are lowered;

g) removing said filter module and replacing it with a new filter module or replacing the filtering media therein, such that the upper lip of said new filter module or filter module with replaced filtering media therein is grasped by said hook-like structures of said means for securing said filter module; and h) rotating said rotatably mounted single lever of said cantered element at the top of said central structural element so that the first and second holes in said central structural element and said first and second holes in said rotatable structural element wall are aligned and so said means for securing said filter module having hook-like structures at lower aspects thereof are raised to secure said filter module to said combination manifold and valve system.

As alluded to, said method of filtering fluid can involve, in step g, replacing filtering media in the filter module. In such a case the filter module can comprise, as viewed in side elevation, receptors in an outer covering thereof which have a vertical and a horizontal section such that each forms an "L" shape. Said filter module then further comprises a filter lid which attaches to said filter module outer covering by way of sliding nibs on said filter lid into the vertical portions of said receptors on said filter module outer covering, and then causing a slight rotation motion of filter lid so that nibs are positioned in the horizontal portions of said receptor portions. When this is the case, the step of replacing said filtering media comprises:

g1) rotating said filter lid so that said nibs thereon are in the vertical sections of the receptors in the filter module outer covering;

g2) removing said filter lid from said filter module by moving it in a direction defined by the locus of said vertical portions of said receptors;

g3) removing old filtering media from said filter module and placing new filtering media thereinto;

g4) positioning said filter lid such that nibs thereon align with vertical portions of the receptors in said filter module outer covering and causing said filter lid to move toward said filter module outer covering in a direction defined by the locus of said vertical portions of said receptors;

g5) causing said filter lid to rotate so that the nibs thereon are caused to be placed into the horizontally oriented portions of said "L" shaped receptors.

The invention will be better understood by reference to the Detailed Description Section of this Specification, in conjunction with the Drawings.

SUMMARY

It is therefore a purpose and/or objective of the present invention to teach a system comprising a manifold and cantered element which comprises a single lever that is required to rotate only ¼ of a turn to, substantially simultaneously, shut-off inlet and outlet fluid supplies, and allow dropping a filter module, which filter module presents with dynamic fluid pressure.

It is further a purpose and/or objective of the present invention to teach a system wherein, when the single lever is rotated ¼ of a turn in an opposite direction, a new filter module can be drawn into an operational position and, substantially simultaneously, the inlet and outlet fluid supplies are re-opened without the required use of tools.

It is another purpose and/or objective of the present invention to teach a system which makes mis-installation of a filter module essentially impossible as the multi-tasking manifold/single lever combination then performs in a single operation what other known systems require two actions to accomplish.

It is another purpose and/or objective of the present invention to teach a system in which the filter module is designed so that the inlet and outlets thereof can only match to the inlet and outlets of the manifold, thereby preventing backward installation.

It is another purpose and/or objective of the present invention to teach a filter module comprising, as viewed in side elevation, receptors in an outer covering thereof which have a vertical and a horizontal section such that each forms an "L" shape; said filter module further comprising a filter lid which attaches to said filter module outer covering by way of sliding nibs on said filter lid into the vertical portions of said receptors on said filter module outer covering, and then causing a slight rotation motion of filter lid so that nibs are positioned in the horizontal portions of said receptor portions.

Other purposes and/or objectives of the present invention will become apparent upon a reading of the Specification and Claims.

BRIEF DESCRIPTION OF THE DRAWINGS

FIGS. 9a-9e show detail of the filter module construction.

DETAILED DESCRIPTION

Figure 1A:
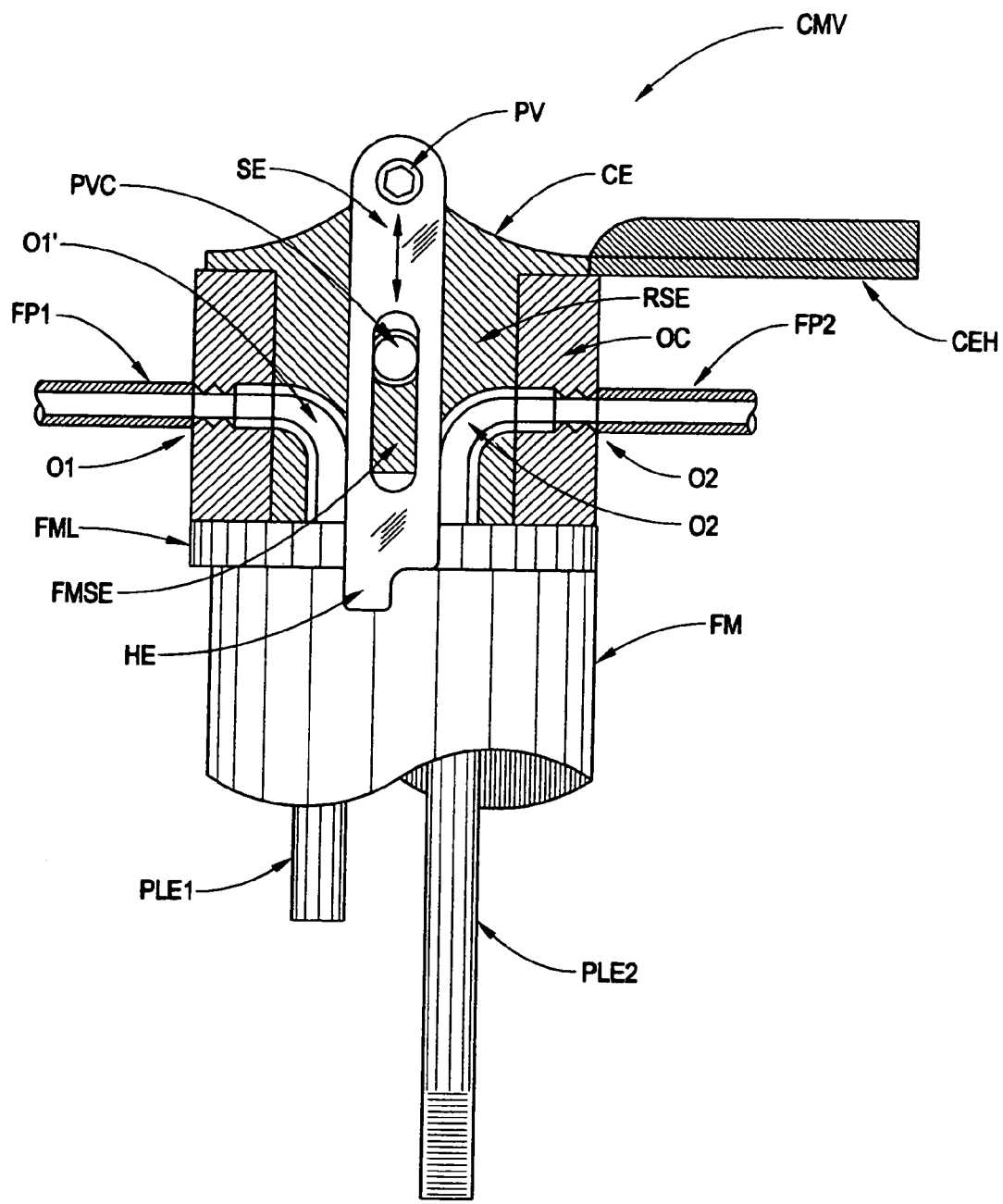
FIGS. 1a, 1b, 3a and 3b show side and top views of an "open" combination manifold and valve system with a filter module removably attached.
Figure 1B:
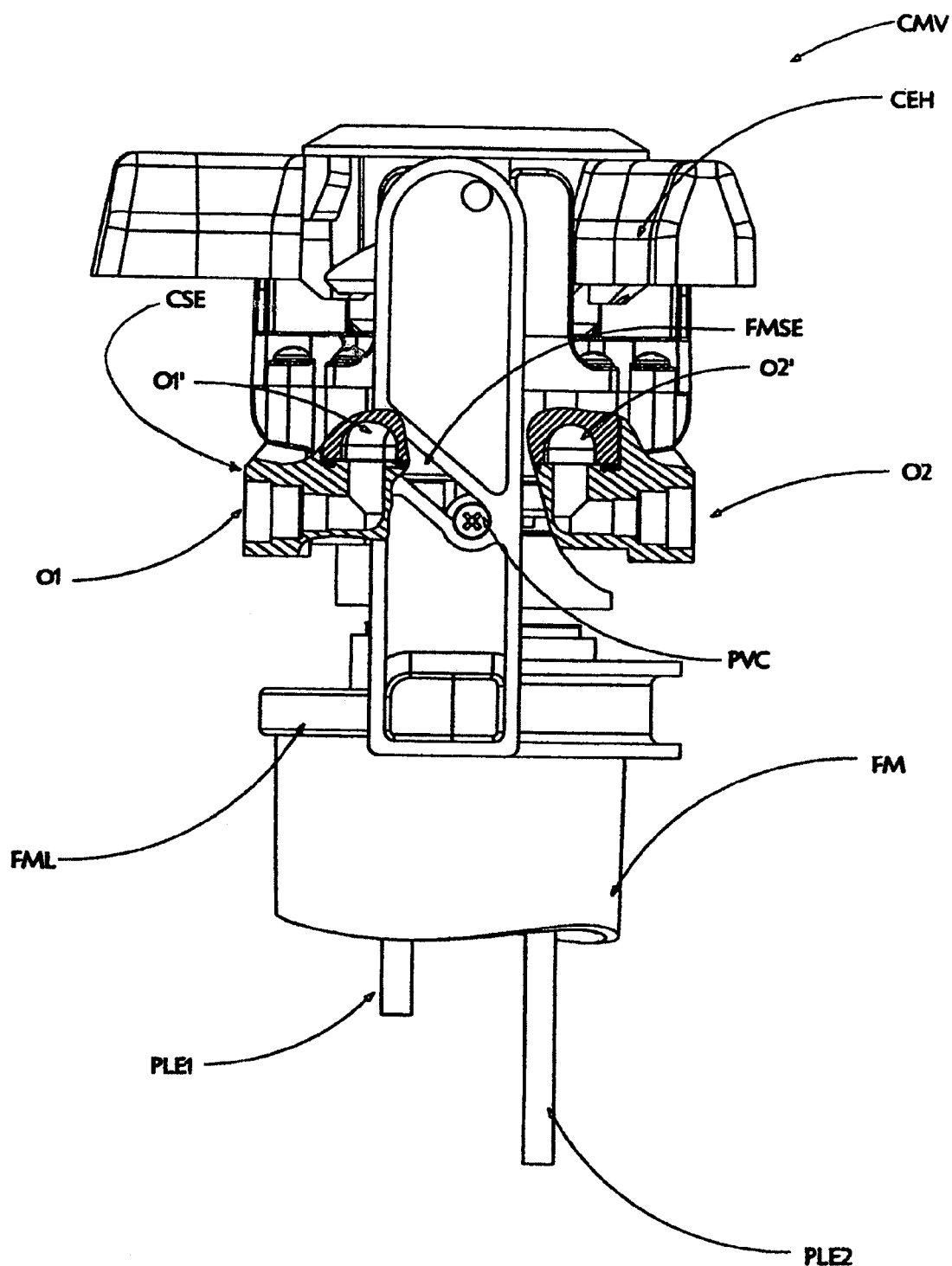
Figure 2A:
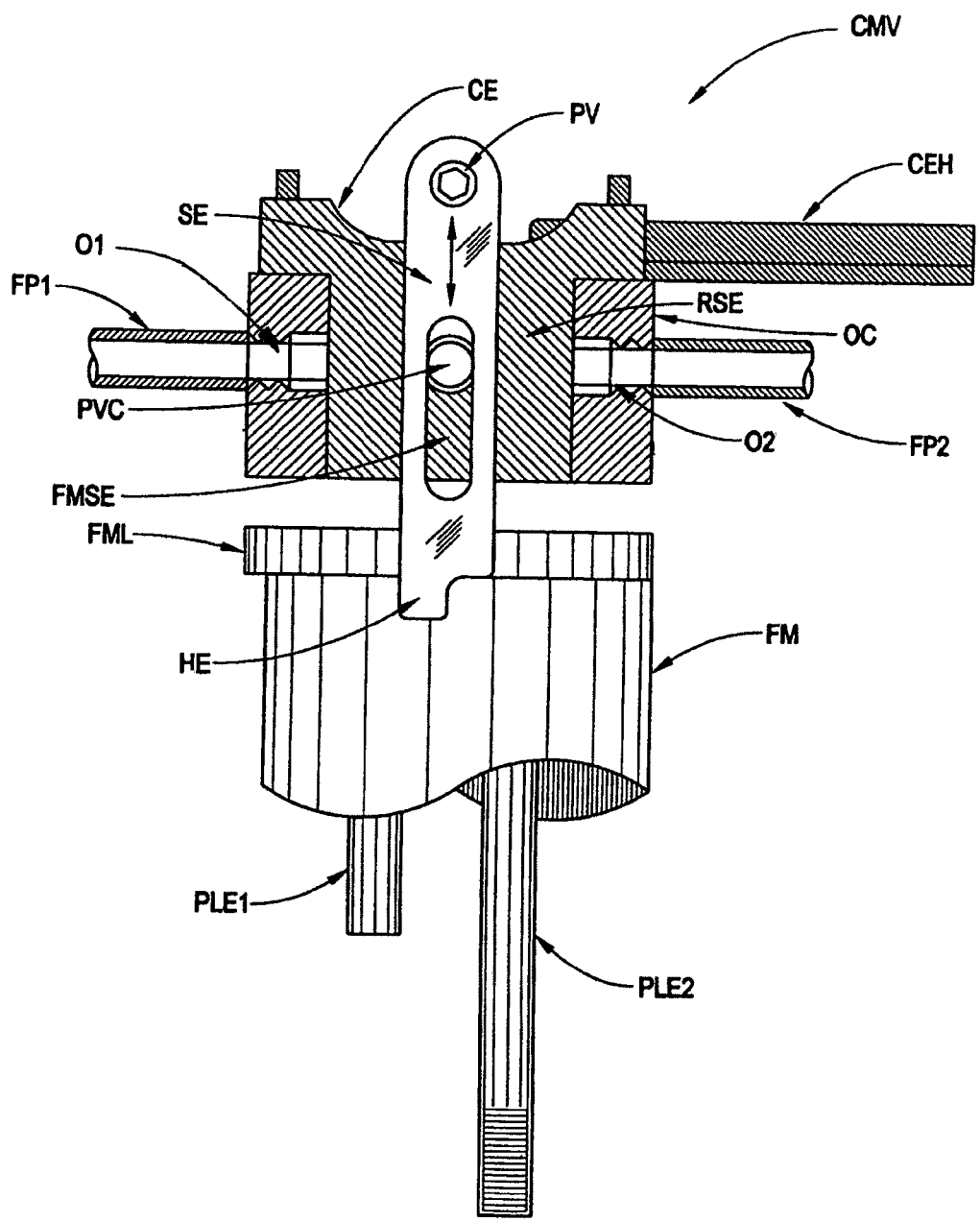
FIGS. 2a, 2b, 4a and 4b show side and top views of a "closed" combination manifold and valve system to which a filter module can be easily removed.
Figure 2B:
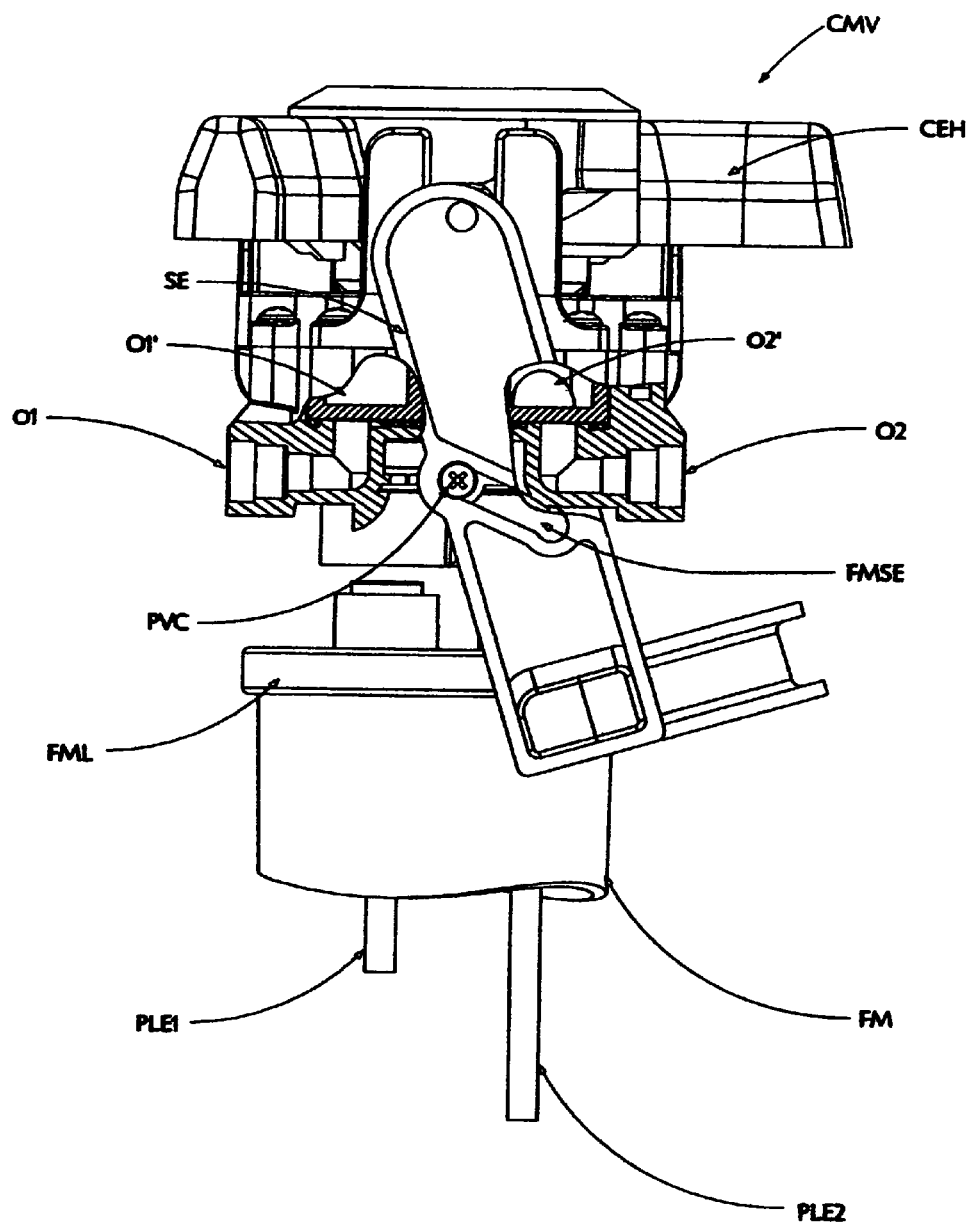
Figure 3A:
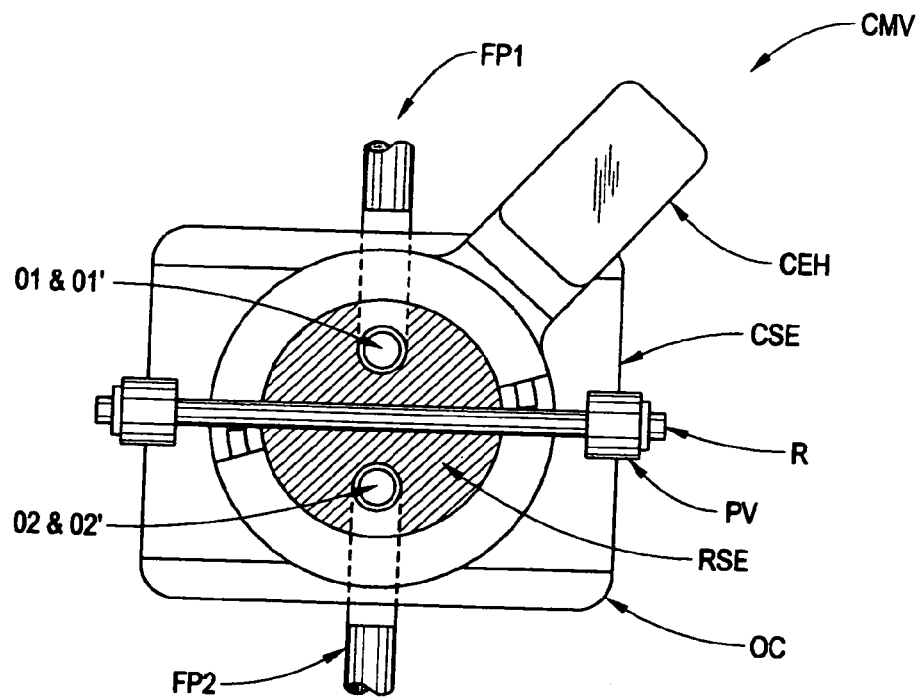
Figure 4A:
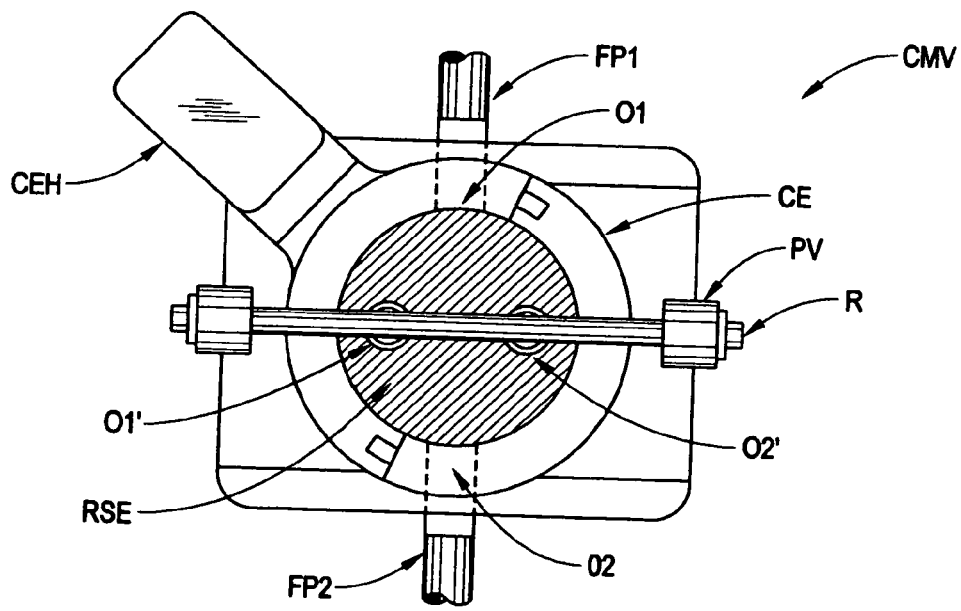
Figure 3B:
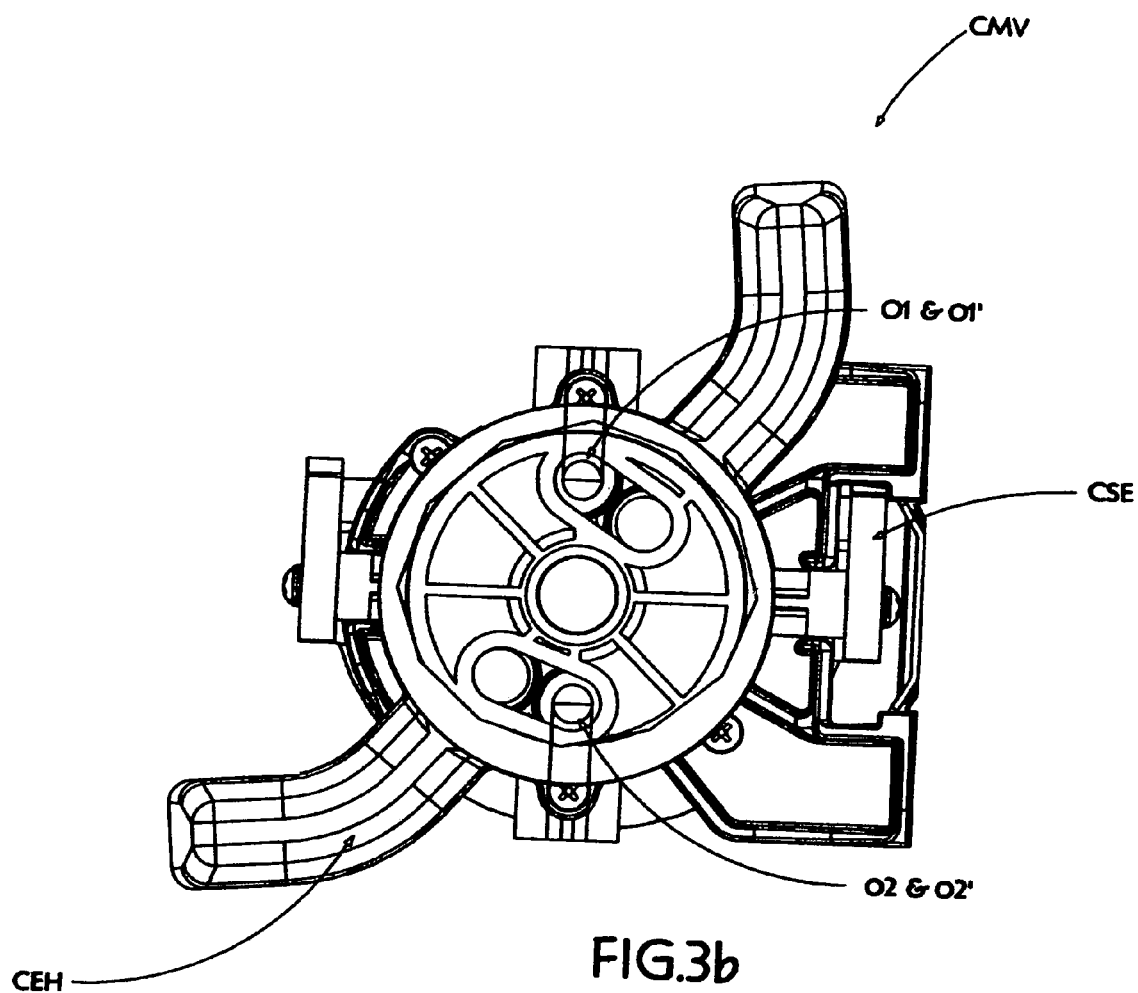
Figure 4B:
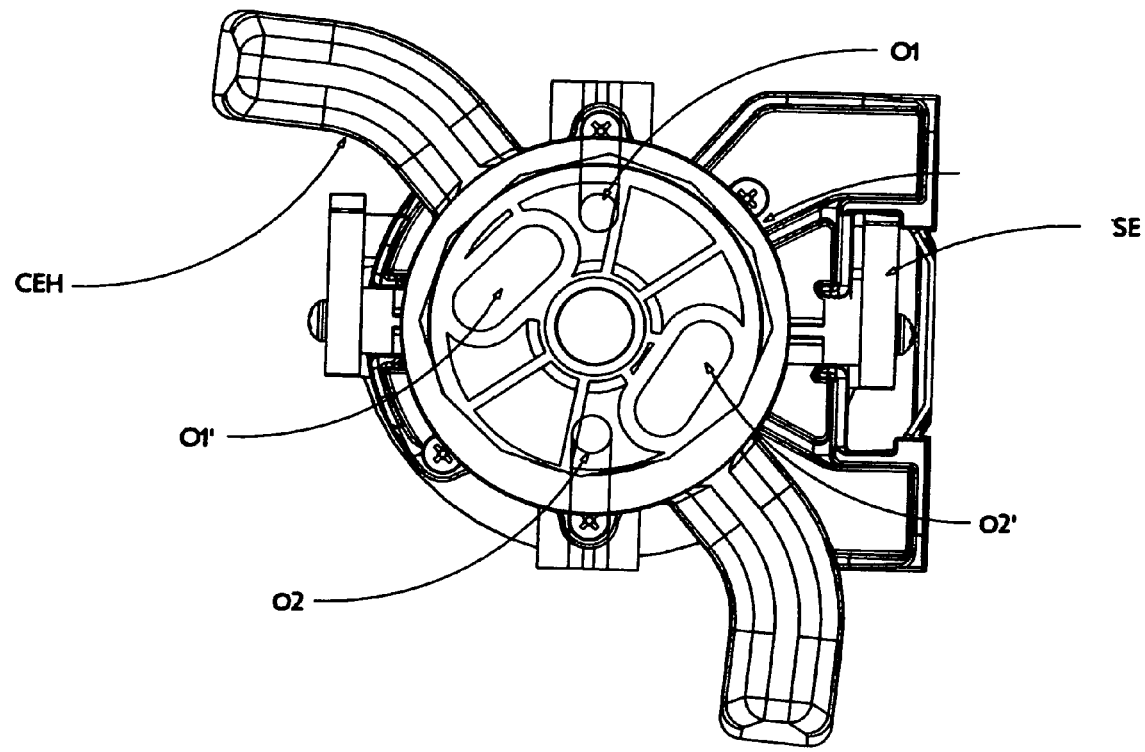
Figure 5A:
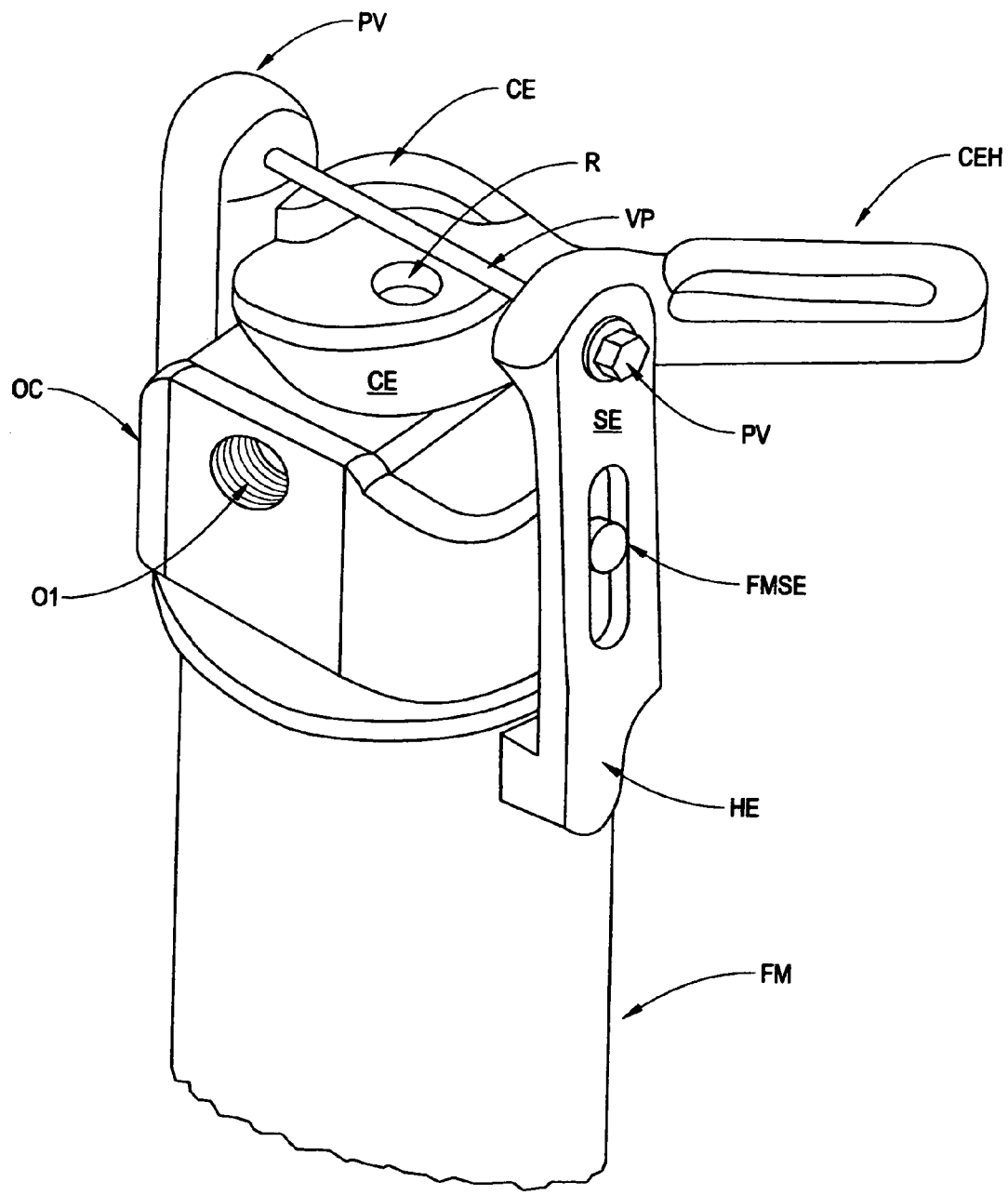
FIGS. 5a, 5b, 6a, 6b, 7a, 7b, 8a and 8b are additional views of the present invention system and provide insight to the system of the present invention.
Figure 5B:
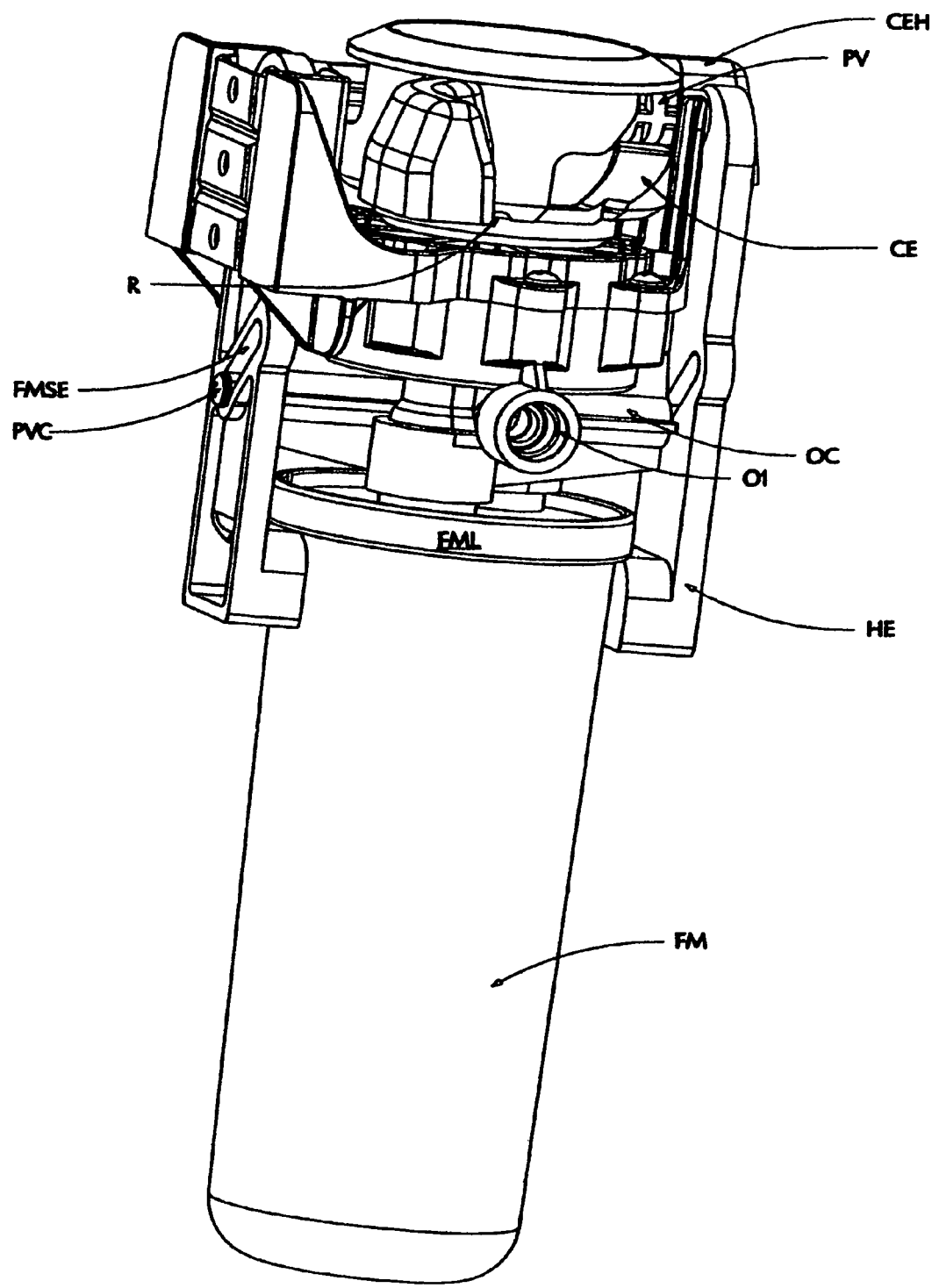
Figure 6A:
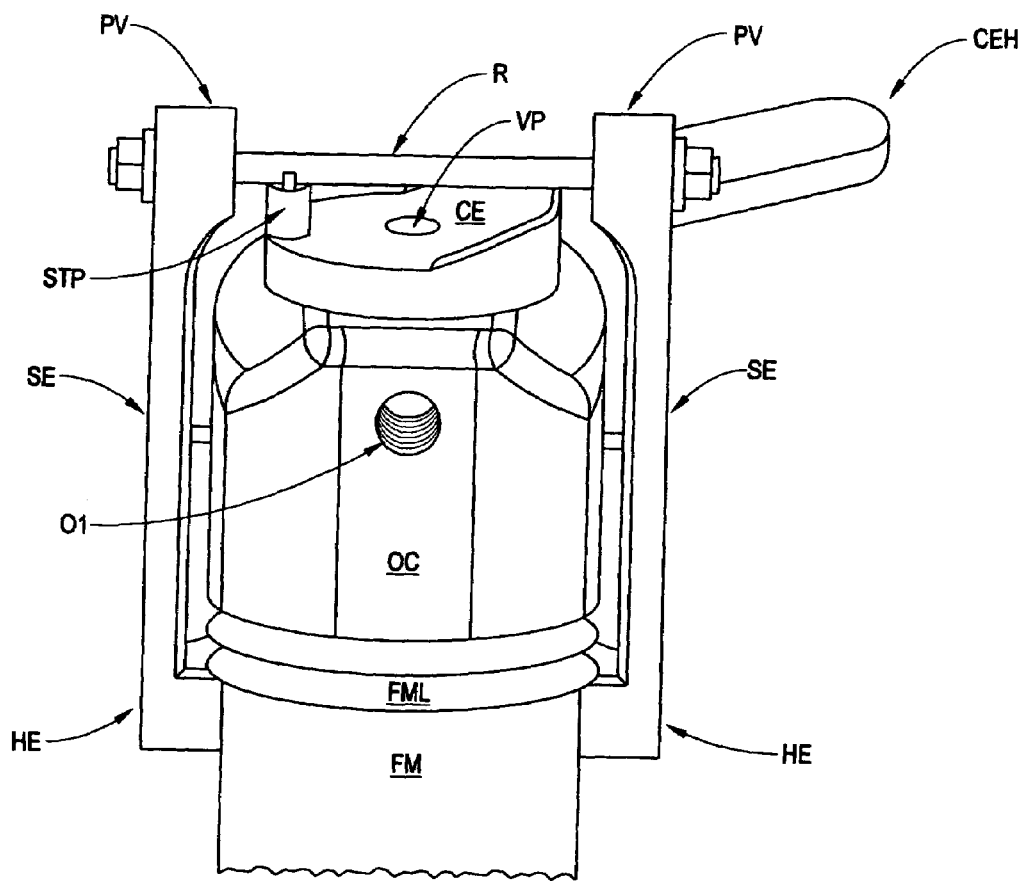
Figure 6B:
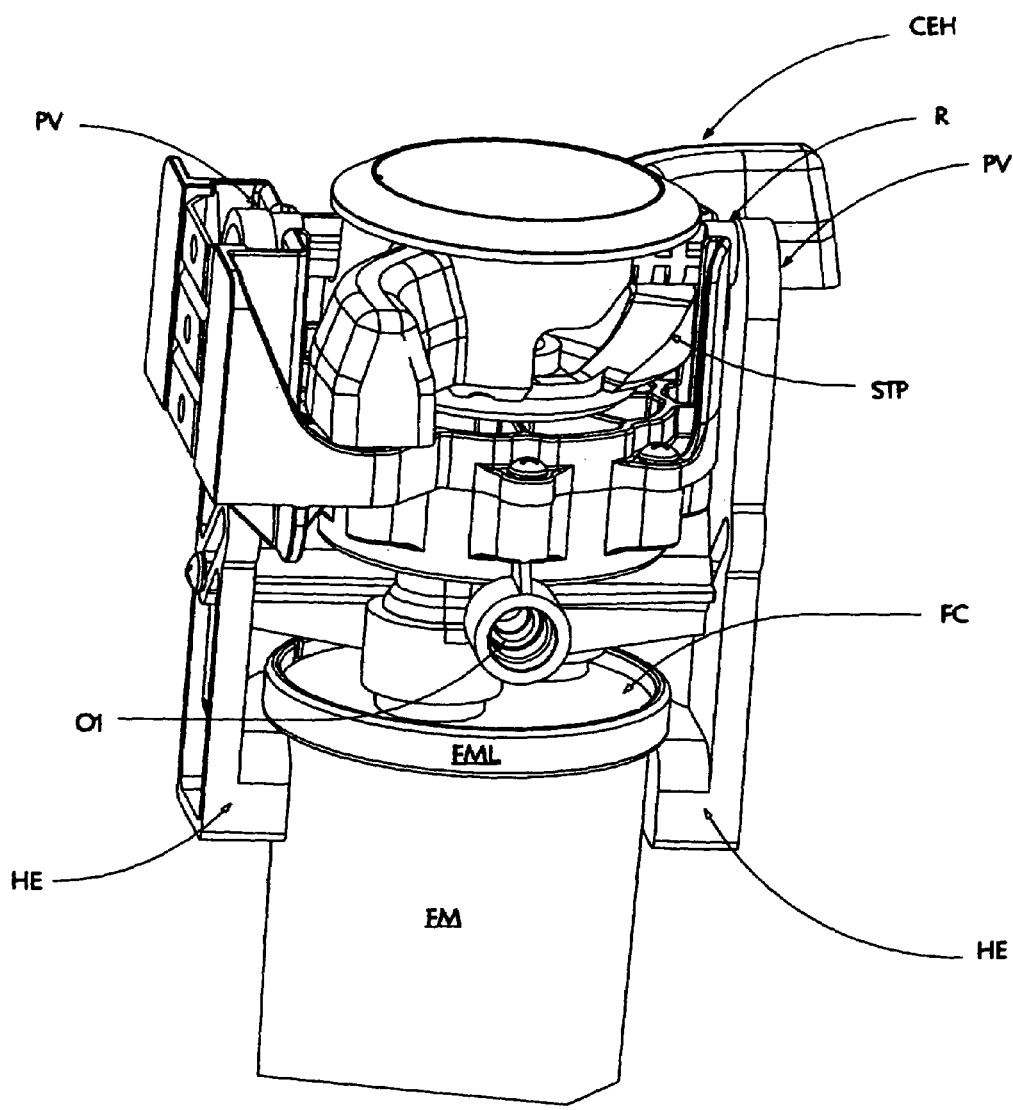

Turning now to the Drawings, it is first noted that two embodiments are demonstrated. FIGS. 1a, 2a, 3a, 4a, 5a, 6a, 7a and 8a show one embodiment and FIGS. 1b, 2b, 3b, 4b, 5b, 6b, 7b and 8b another. A major distinction between the embodiments is found in an elongated dimension of a slit (FSME) shaped opening being projected vertically or at an angle between vertical and horizontal.

FIGS. 1a-4b show the present invention combination manifold and valve system (CMV) that comprises a central structural element (CSE) which has a substantially closed top and sides. Said sides have first (O1) and second (O2) openings therein, each of which is suitable for attaching thereto a fluid carrying pipe (FP1) (FP2). It is noted that a preferred attachment means is a John Guest Coupler placed inside (O1) or (O2) which allows mounting a pipe via a simply pushing it thereinto.

During use, a filter module (FM) comprising filter media therewithin, is secured to the lower extent of said central structural element (CSE). Present in said central structural element (CSE) there is a substantially circular (as viewed from above), inner cavity, in which is a rotatable structural element (RSE) has first (O1') and second (O2') openings in said wall, which openings are functionally projected inwardly into said inner circular cavity and then downward in the form of unequal lengths of pipe-like elements (PLW1) (PLE2). In use, fluid entered into one pipe-like element (PLW1) (PLW2) passes through said filter module (FM) which is affixed to the lower aspect of said combination manifold and valve system (CMV) and out of the other (PLW2) (PLW1) thereof. Said first (O1) and second (O2) openings in said central structural element (CSE) and said first (O1') and second (O2') openings in said rotatable structural element (RSE) in the inner cavity of the CSE) are arranged with respect to one another such that when the first (O1) of the openings in said central structural element (CSE) and the first (O1') of said openings in said rotatable structural element (RSE) are aligned by relative rotation therebetween, then simultaneously so are the second (O2) openings in the central structural element (CSE) and said second (O2') opening is said rotatable structural element (RSE). There is a cantered element (CE) at the top of said central structural element (CSE) having a single rotatable lever (CEH), and there are means for securing (SE) said filter module (FM) slidably affixed to the sides of said central structural element (CSE). Said cantered element (CE) and means for securing (FMSE) said filter module (FM) are functionally interrelated such that causing said cantered element (CE) to rotate causes said means for securing (FMSE) said filter module (FM) to slide with respect to said central structural element (CSE). Said means for securing (FMSE) said filter module (FM) have hook-like structures (HE) at lower aspects thereof, and said combination manifold and valve system (CMV) filter module (FM) further comprises a lip (FML) at an upper extent thereof, which hook-like structures (HE) are of a shape to catch.

FIGS. 5a-8b provide additional insight to the system of the present invention wherein the filter module (FM) is secured to the combination manifold and valve system (CMV). In particular, note that a rod (R) projects between Pivots (PV) that secure said means for securing (FMSE) said filter module (FM). Also note that said rod (R) rides atop said cantered element (CE), such that when lever (CEH) is caused to be rotated about a substantially vertical axis (VP), (viewed in side elevation as shown), said rod (R), and hence said means for securing (SE) said filter module (FM) having hook-like structures (HE) at lower aspects thereof, are caused to be raised and lowered. The FIGS. 1a-8b show an embodiment of the present invention in which rotation of the lever (CEH) in a clockwise direction, as viewed from above, secures the filter module (FM) to the combination manifold and valve system (CMV) also aligns (O1) to (O1') and (O2) to (O2'). It is to be understood that another embodiment provides that the lever (CEH) rotates counter-clockwise, similarly viewed, to effect a similar alignment of (O1) to (O1') and (O2) to (O2'). It is further noted that said single rotatable lever can be of a single projection construction or can have two projections oriented at 180 degrees from one another about a centrally located vertically oriented axis, or can be of any other functional configuration. FIGS. 6a and 6b show the hook-like structures (HE) at the lower extents of (SE) which catch the lip (FML) located at the upper aspect of said filter module (FM), and also show first opening (O1). It is to be understood that hook-like structures (HE) can be independently present on two means for securing (SE) said filter module (FM), or the means for securing (SE) said filter module (FM) can be of a half circle in shape, as viewed from atop or from below, and the means for securing (SE) said filter module (FM) can be distributed continuously or piecewise over all or a part thereof. Note that a stop rotation element (STP) is also shown in FIGS. 6a and 6b, but differ in embodiment. FIG. 7a shows the system of the present invention from the opposite side as that in FIG. 6a, such that outlet opening (O2) is visible. FIG. 8a shows another view of the present invention system showing the elements shown in FIG. 7a.

Figure 7A:
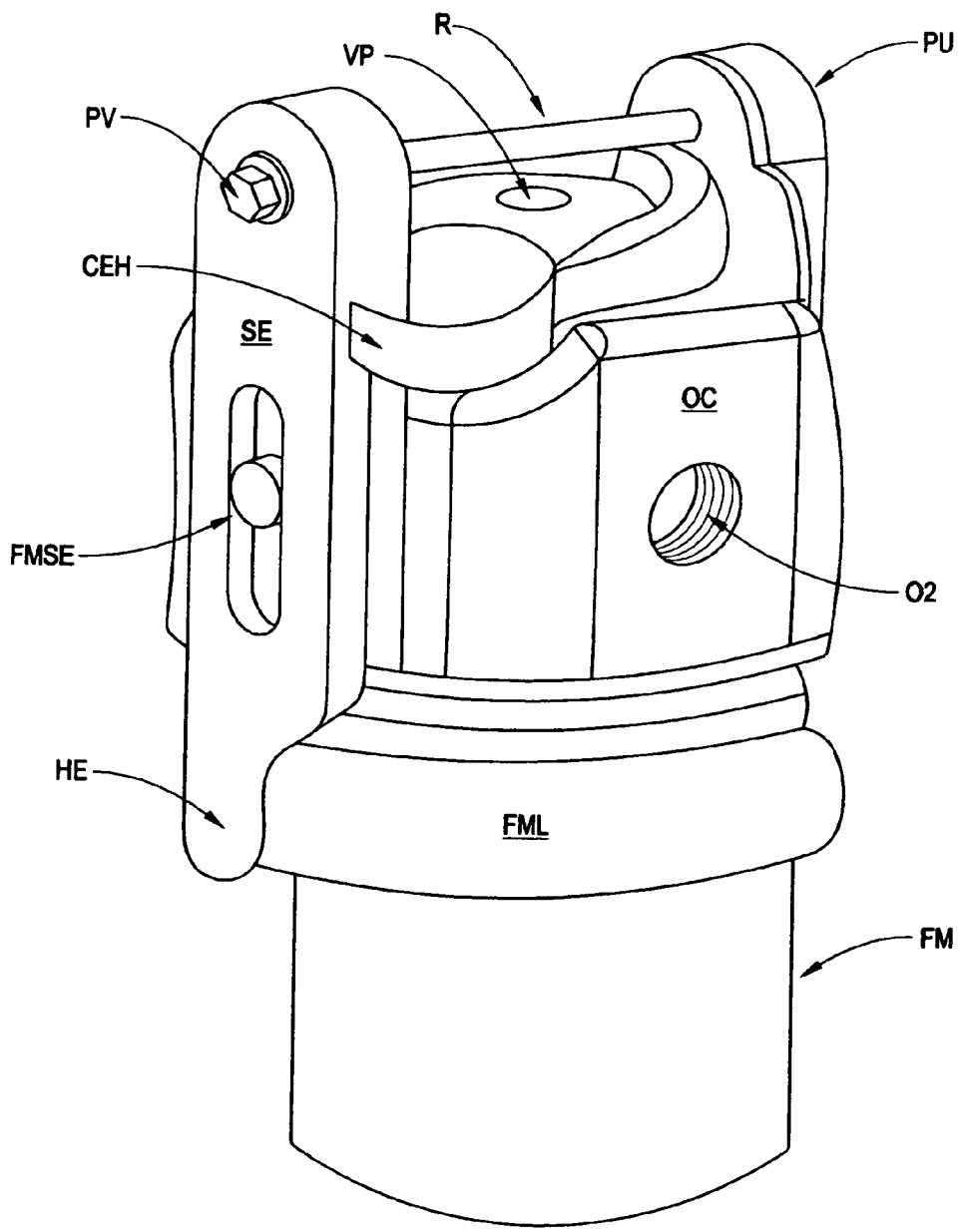
Figure 7B:
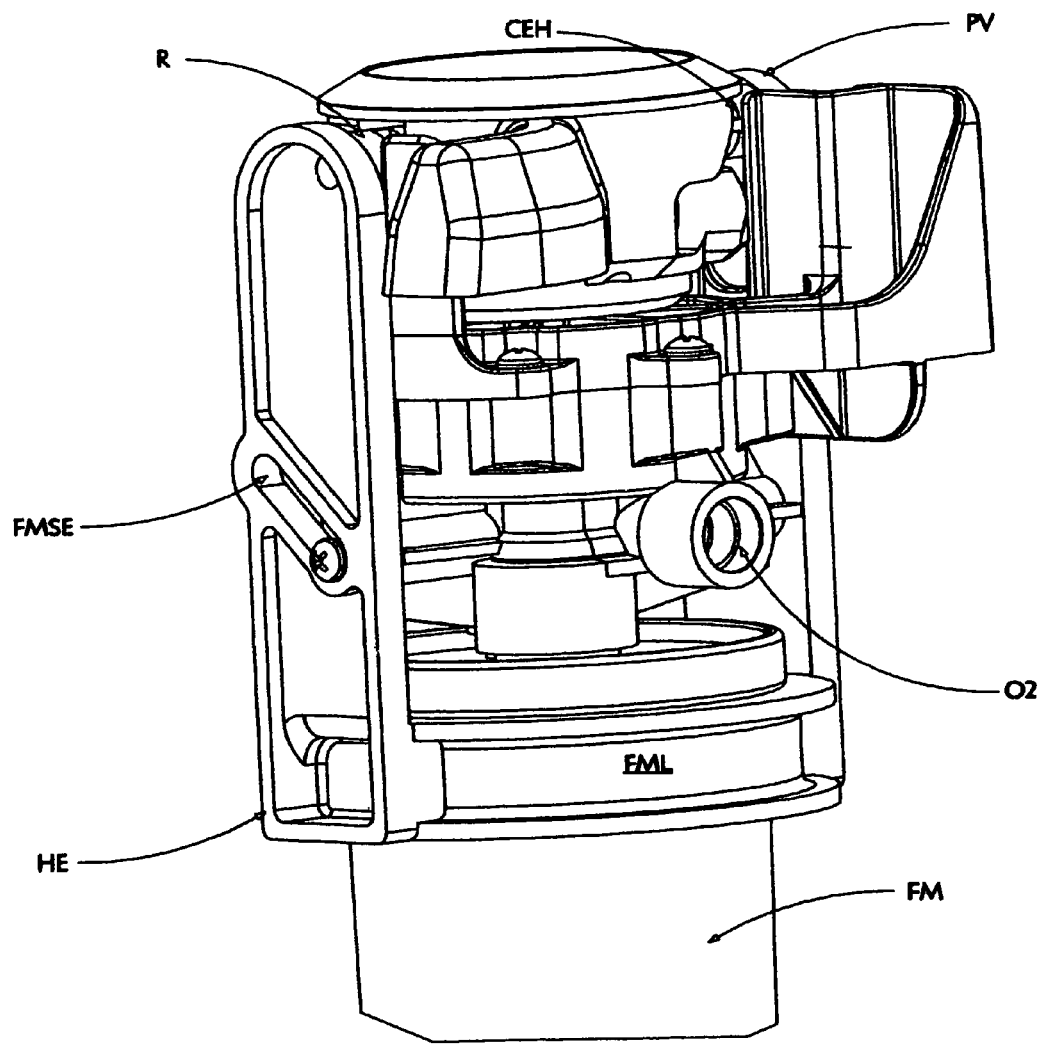
Figure 8A:
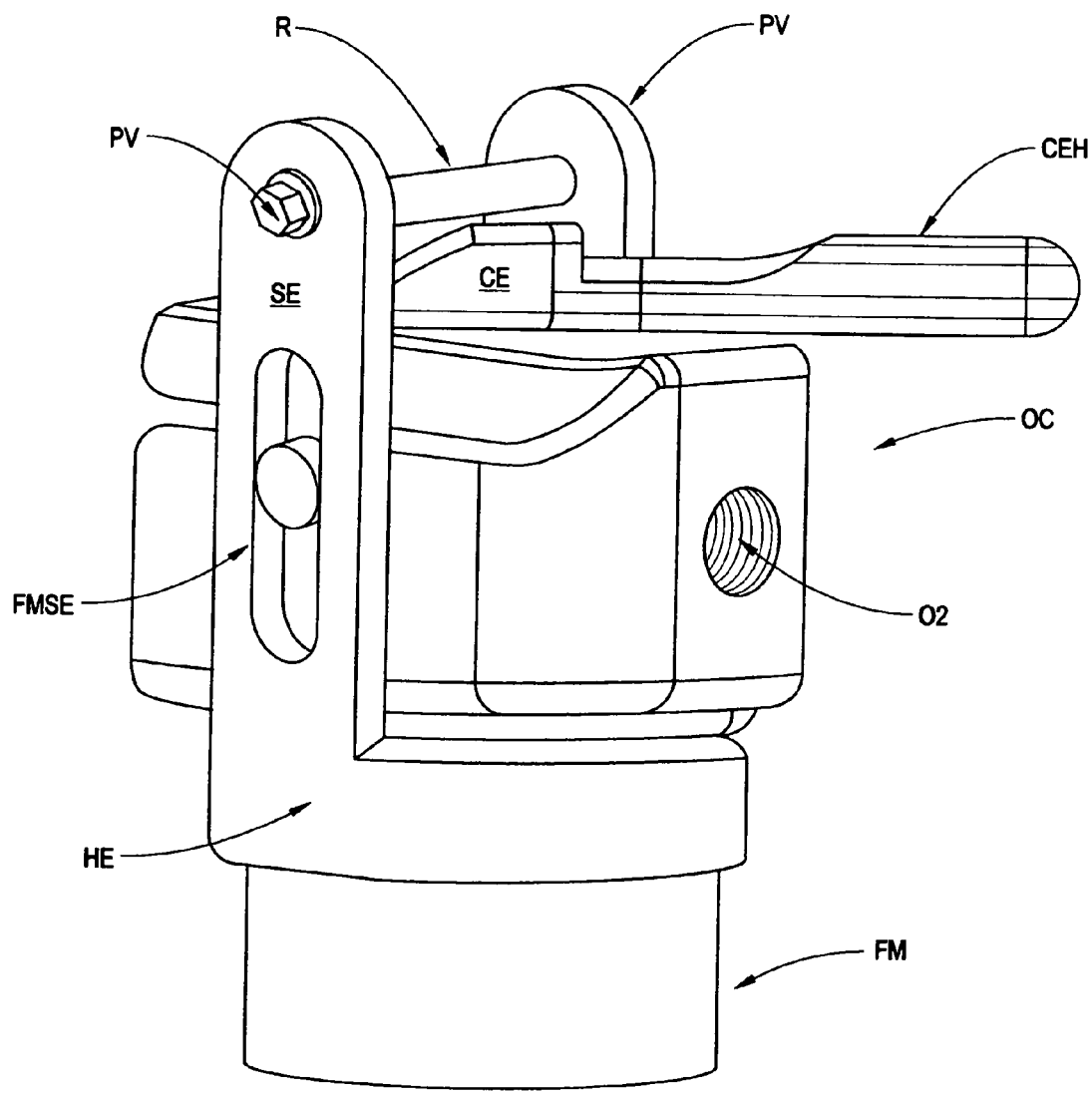
Figure 8B:
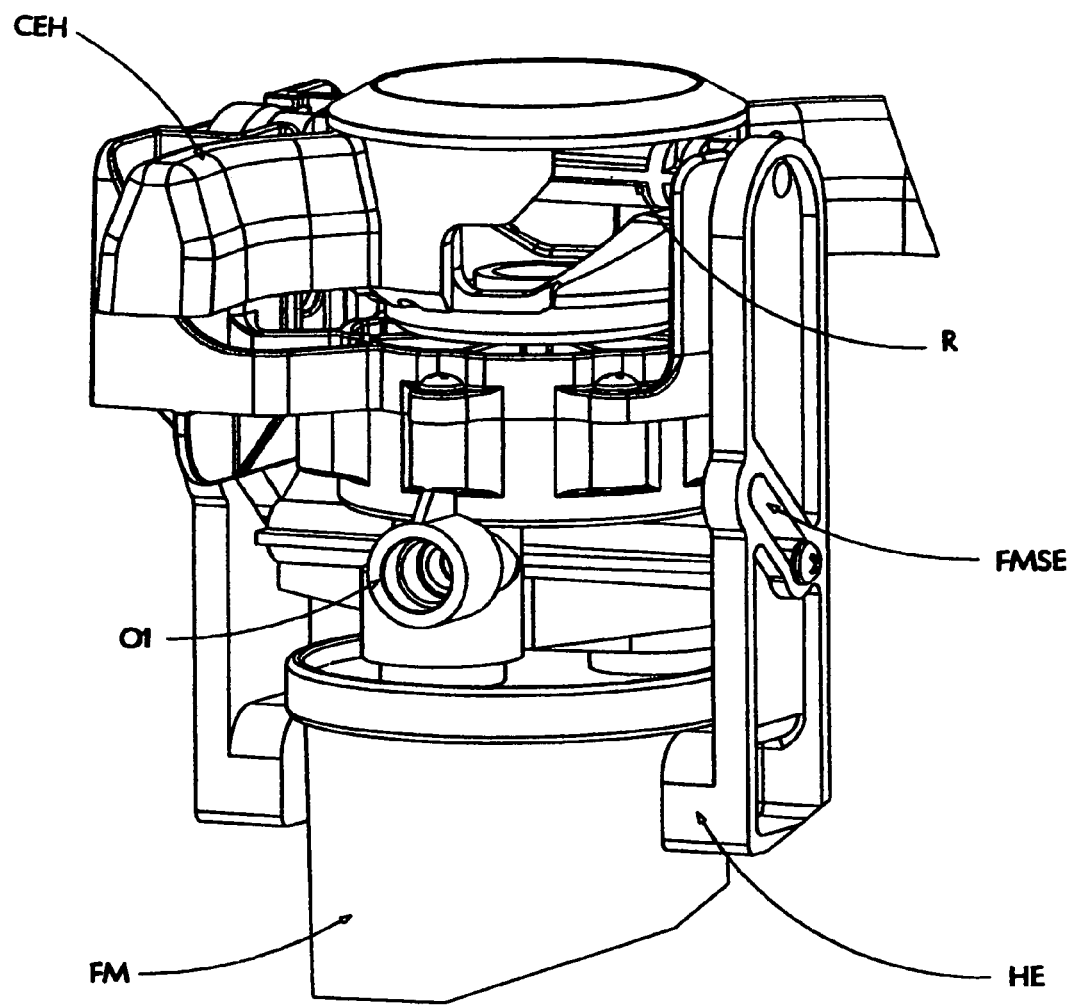

Note that FIGS. 5a, 5b, 7a, 7b, 8a and 8b further show that the means for securing (SE) said filter module (FM) having hook-like structures (HE) at lower aspects thereof, comprise a slit shaped opening (FSME), into which slit shaped opening (FSME) projects a rod (PVC) which is secured stationary with respect to said central structural element (CSE). Said rod (PVC) can be secured directly to said central structural element (CSE) or to a outer covering (OC) which at least partially contains said central structural element (CSE). Note that the operation of the slit shaped opening (FSME) and rod (PVC) is to provide guidance for the vertical motion of the filter module (FM) with respect to the central structural element (CSE) when the lever (CEH) is caused to be rotated about a substantially vertical axis (VP). Note that said (FSME) slit shaped opening is elongated and oriented such that its elongated dimension projects substantially vertically, as shown in FIGS. 7a and 8a, or as shown in FIGS. 7b and 8b, such that its elongated dimension projects at an angle between vertical and horizontal. The later configuration has been found to provide better strength and certainty of operation.

It is noted that the designation (OS) in various drawings indicates the outer surface of the central structural element (CSE) per se., or a covering which substantially contains the central structural element (CSE).

Figure 9C:
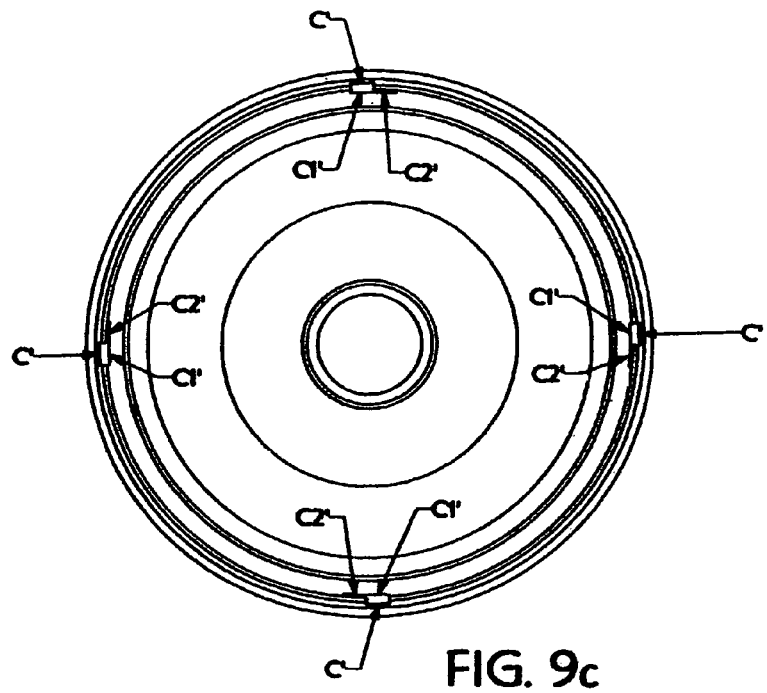
Figure 9D:
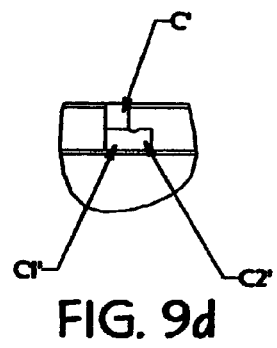
Figure 9E:
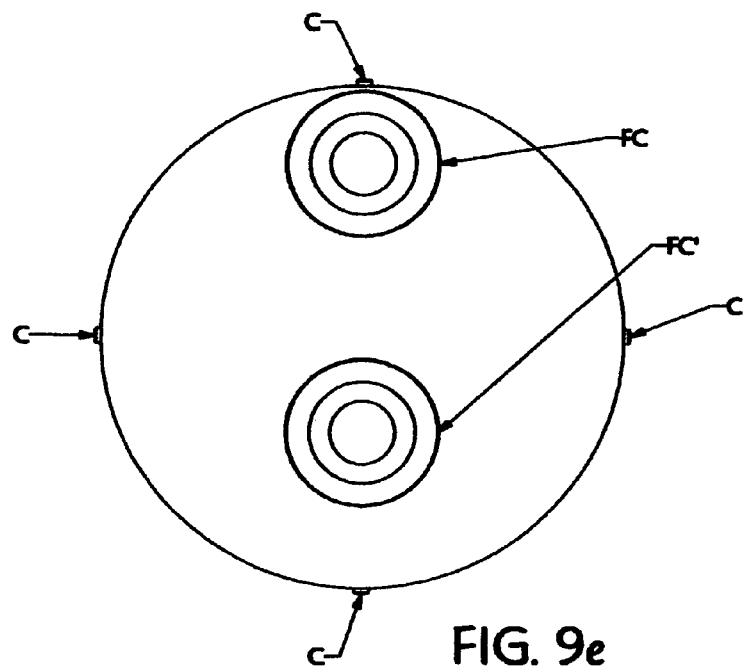

Continuing, FIGS. 9a-9e show detail of the filter module (FM) construction. FIG. 9a shows a cut-away view of the upper portion of the filter module (FM) with a filter coupler (FC) indicated. FIGS. 9b1 and 9b2 show that the filter coupler (FC) is attached to a filter lid (FL) which can be removed from the filter module (FM). As indicated by FIGS. 9c, 9d and 9e, the preferred approach to coupling the filter lid (FL) to the filter module (FM) is by way of sliding nibs (C) into receptors (C1') in a filter module outer covering and then causing a slight rotation motion of filter lid (FL) so that nibs (C) are positioned in receptor portions identified as (C2'). FIGS. 9c and 9e show top views and FIG. 9d shows a side elevational view of the receptors (C) as they would appear looking from the inside of the filter module (FM) toward the filter module lip (FML). Note that FIG. 9e also shows that filter couplers (FC) can be positioned in the filter lid (FL) so that there is only one way that the filter lid (FL) can be fit into the central structural element (CSE) of the combination manifold and valve system. This, of course requires complimentary design of the location of the downward projections of the unequal lengths of pipe-like elements (PLW1) (PLE2) in the central structural element which functionally couple to said filter couplers (FC) when the present invention combination manifold and valve system to which a filter module removably attaches, is being used to filter fluid.

It is believed that a system comprising a manifold and a cantered element comprising a single lever which is required to rotate only ¼ of a turn about a substantially vertically oriented axis, to substantially simultaneously, shut-off inlet and outlet fluid supplies, and allow dropping a filter module, therefrom, wherein the filter module comprises a filter lid and an outer cover which functionally interconnect via rotatably interconnecting nib-"L" shaped receptor means, is new, novel and non-obvious. Further, when the single lever is rotated ¼ of a turn in an opposite direction, a new filter module can be drawn into an operational position and, substantially simultaneously, the inlet and outlet fluid supplies are re-opened. No tools are required, and the simple operation makes mis-installation of a filter module essentially impossible. The multi-tasking manifold/single lever combination performs, in a single operation, what other known systems require two actions to accomplish. In addition, the filter module is designed so that the inlet and outlets thereof can only match to the inlet and outlets of the manifold, thereby preventing backward installation.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

I claim:

1. A combination manifold and valve system for removable attachment to a filter module, the system comprising:
    a central structural element including an inflow opening, an outflow opening and a substantially circular inner cavity;
    a rotatable structural element positioned within the inner cavity of the central structural element and including a first opening, a second opening and a cantered element; and
    a securing member slideably attached to the central structural element and interfacing with the cantered element of the rotatable structural element;
    wherein the rotatable structural element is rotatable, with respect to the central structural element and the securing member, from a first position to a second position;
    at the first position, the first opening of the rotatable structural element is aligned with the inflow opening of the central structural element, the second opening of the rotatable structural element is aligned with the outflow opening of the central structural element, and the cantered element interfaces with the securing member so as to hold the securing member in a securing position at which the securing member secures the filter in operational engagement with the central structural element of the system; and
    at the second position, the first opening of the rotatable structural element is completely offset from the inflow opening and the second opening of the rotatable structural element is completely offset from the outflow opening, so as to shut off the inlet and outlet openings, and the cantered element interfaces with the securing member thereby allowing the securing member to be released from the securing position so that the filter module can either be attached to or removed from the system.

2. The system of claim 1, wherein the securing member includes a rod that interfaces with the cantered element of the rotatable structural element, and a hook-like structure for catching a lip of the filter module.

3. The system of claim 1, wherein the rotatable structural element further includes a lever for rotating the rotatable structural element between the first and second positions.

4. The system of claim 1, wherein rotation of the rotatable structural element, between the first and second positions, is limited to a ¼ turn.

* * * * *